United States Patent [19]
Finsterwald

[11] Patent Number: 6,039,244
[45] Date of Patent: Mar. 21, 2000

[54] METHOD OF BUILDING UP A DATA BANK CONTAINING CUSTOMER DATA AND/OR FOR THE ORGANIZATION OF A REBATE OR COUPON SYSTEM

[76] Inventor: Martin Finsterwald, Thierschstr. 53, Munich, Germany

[21] Appl. No.: 08/783,372

[22] Filed: Jan. 13, 1997

[30] Foreign Application Priority Data

Oct. 4, 1996 [DE] Germany ............... 196 41 092
Jan. 2, 1997 [EP] European Pat. Off. .. PCT/EP97/00005

[51] Int. Cl.[7] ................................. G06K 7/10
[52] U.S. Cl. ............... 235/375; 235/468; 235/383; 705/14; 705/26
[58] Field of Search .................. 235/375, 379, 235/380, 383, 462, 472.01, 468; 705/14, 26, 501, 513

[56] References Cited

U.S. PATENT DOCUMENTS

| | | | |
|---|---|---|---|
| 4,024,380 | 5/1977 | Gunn ................. | 235/61.9 |
| 4,109,238 | 8/1978 | Creekmore ............... | 235/379 |
| 4,649,481 | 3/1987 | Takahashi ............... | 364/405 |
| 4,750,119 | 6/1988 | Cohen .................. | 364/401 |
| 4,752,675 | 6/1988 | Zetmeir ................ | 235/375 |
| 4,908,761 | 3/1990 | Tai .................... | 364/401 |
| 5,056,019 | 10/1991 | Schultz ................ | 364/405 |
| 5,173,851 | 12/1992 | Off .................... | 364/401 |
| 5,200,889 | 4/1993 | Mori ................... | 364/401 |
| 5,287,268 | 2/1994 | McCarthy ............... | 364/405 |
| 5,310,997 | 5/1994 | Roach et al. ........... | 235/383 |
| 5,319,562 | 6/1994 | Whitehouse ............. | 364/464.03 |
| 5,353,218 | 10/1994 | De Lapa ................ | 364/401 |
| 5,367,148 | 11/1994 | Storch et al. .......... | 235/375 |
| 5,382,779 | 1/1995 | Gupta .................. | 235/383 |
| 5,408,077 | 4/1995 | Campo et al. ........... | 235/380 |
| 5,467,269 | 11/1995 | Flaten ................. | 364/401 |
| 5,483,444 | 1/1996 | Heintzeman ............. | 364/401 |
| 5,537,314 | 7/1996 | Kanter ................. | 705/14 |
| 5,592,560 | 1/1997 | Deaton ................. | 382/100 |
| 5,602,377 | 2/1997 | Beller et al. .......... | 235/462 |
| 5,665,951 | 9/1997 | Newman et al. .......... | 235/375 |
| 5,665,953 | 9/1997 | Mazzamuto et al. ....... | 235/383 |
| 5,727,163 | 3/1998 | Bezos .................. | 235/379 |
| 5,791,991 | 8/1998 | Small .................. | 463/41 |
| 5,794,210 | 8/1998 | Goldhaber et al. ....... | 705/10 |
| 5,809,144 | 9/1998 | Sirbu et al. ........... | 705/26 |

FOREIGN PATENT DOCUMENTS

| | | |
|---|---|---|
| 0 377 515 | 7/1990 | European Pat. Off. . |
| 3723189 A1 | 2/1988 | Germany . |
| 69018007 | 10/1995 | Germany . |

OTHER PUBLICATIONS

Masing, Walter, *Handbuch der Qualitätssicherung*, Carl Hanser Verlag, München, Wien, 1890. pp. 709–726.

*Primary Examiner*—Donald Hajec
*Assistant Examiner*—Daniel St. Cyr
*Attorney, Agent, or Firm*—Townsend and Townsend and Crew LLP

[57] ABSTRACT

The invention relates to a method of building up a data bank containing customer data and/or for the organization of a rebate or coupon system. Furthermore, the invention relates to the use of such a method and also to computerized tills usable in the context of the method, to printed till receipts, printed invoices, printed entry cards, product packages, product labels and product tags. Finally, the invention also relates to an apparatus for the production of the said product packages, product labels and product tags. In the context of the invention products to be sold to customers, or records handed out to the customers on purchase of products or services, are respectively provided with an individual code and the code is transmitted by the customer, after purchase of the product or of the service, together with data characterizing the respective customer to a data collecting station via a communication network, in particular via the Internet or via a telephone network, with the data collecting station being laid out to at least store the data characterizing the respective customer.

3 Claims, 2 Drawing Sheets

METHOD OF BUILDING UP A DATA BANK CONTAINING CUSTOMER DATA AND/OR FOR THE ORGANIZATION OF A REBATE OR COUPON SYSTEM

BACKGROUND OF THE INVENTION

The invention relates to a method of building up a data bank containing customer data and/or for the organisation of a rebate or coupon system. Furthermore, the invention relates to the use of such a method and also to computerised tills usable in the context of the method, to printed till receipts, printed invoices, printed entry cards, product packages, product labels and product tags. Finally, the invention also relates to an apparatus for manufacturing the said product packages, product labels and product tags.

It is desirable for those offering products and/or services, in particular for the manufacturers of proprietary products, to make the sale of the product and/or services offered more attractive, to achieve the greatest possible customer loyalty and finally also to be able to enter directly into contact with the respective customer in order in this way to obtain knowledge of their purchasing behaviour. The latter in turn makes it possible to adapt the particular marketing strategy being pursued as well as possible to the respectively prevailing situation.

In order to achieve the above named goals, complicated rebate systems are frequently offered in accordance with the prior art, or competitions are organised, with the high organisational and technical administrative cost being disadvantageous in each case.

SUMMARY OF THE INVENTION

The invention is based on the object of making available a system by means of which the manufacturers and offerees of products and/or services have the opportunity, with little economic cost or complexity, of making the sale of their products and/or services more attractive, of achieving the largest possible customer loyalty and, through knowledge of the customer-specific data, of entering directly into contact with customers and to flexibly select corresponding marketing strategies.

In accordance with the invention this object is satisfied in that products to be sold to customers or records handed out to customers on the purchase of products or services are in each case provided with an individual code and the code is transmitted by the customer after the purchase of the product or the service, together with data characterising the respective customer, to a data collecting station via a communication network, in particular via Internet or a telephone network, with the data collecting station being laid out to at least store the data characterising the respective customer.

Thus, in accordance with the invention, an individual code, i.e. a code associated with a special purchase action is made accessible to the customer on making a purchase which the customer, after making the purchase, transmits to a data collecting station via a communication network, in particular via Internet or via a telephone network. Together with the code the customer also transmits data characteristic of himself, such as for example his postal address or his Internet address. The last named data are then stored in the data collecting station when the data collecting station recognises that the code transmitted is a valid code. The way in which this validity check can take place in detail will be described in more detail in the following in the context of explaining preferred embodiments.

The customer is motivated to transmit the code and the data characteristic of himself by the fact that this data transmission enables him to participate in a bonus program or in a competition.

The method of the invention can be realised in an extremely economical manner because it is possible, without substantial technical cost or complexity, to provide the product packages for example, which must in any case be printed, with an additional code, or to apply a code to a record which must, in any event, be printed. Furthermore, in accordance with the invention, it is no longer necessary, in comparison to customary competitions or rebate systems, to send data or addresses via the postal route, since the transfer of the code and also of the data characterising the particular customer takes place via an electronic communication network, in particular via Internet or a telephone network. This type of data transfer is associated with a substantially lower administrative cost and complexity for the receiver of the data and also with less cost and complexity for the customer transmitting the data.

The system of the invention can be used particularly advantageously when the data transmission is handled via the Internet. In this case, the customer can collect points or "miles" in a unitary system when purchasing products or services of the most diverse offerees participating in the system of the invention, independent of the offerees, through the transmission of the respective code. These points or miles can then be cashed in in different ways to the advantage of the customer. Thus, it is for example conceivable to operate "Internet shopping" with these points, to change the collected points into e-cash, to purchase rights of use of specific Internet services with the collected points, or to participate in exclusive competitions, with the entitlement to participate being bought by the cashing in of a specific number of the collected points.

In addition to these advantages, which are clear to the customer, the participation in the system of the invention is also of great interest to those offering products and services, in particular for those selling or offering proprietary articles, because the granting of a specific number of points to a purchased product or to a purchased service makes the purchase of this product or of this service more attractive to the customer in comparison to those of competing offerees. The offeree of products or services with which collectable points are associated in the context of the system of the invention can thus count on increased sale of his products or services by participating in the system of the invention.

When practising the method of the invention, the code handed out with the product or with the service serves to show that the customer has actually purchased the relevant product or the relevant service, i.e. the customer shows through knowledge of the code that a corresponding purchase has been made.

In order to avoid misuse of the system of the invention, it is sensible to store the code before the purchase or of the service and without the participation of the customer in the reference memory associated with the data collecting station, to compare the code transmitted by the customer, after the transmission of the code by the customer to the data collecting station, with the code previously stored in the reference memory and finally only to take account of those transmitted codes which were already previously stored in the reference memory.

The procedure explained above ensures that only those codes are taken into account as valid codes which have also actually been handed out to customers together with an acquired product or service.

It is of particular advantage when additional information relating to the product or to the service is stored in the data collecting station, preferably in the reference memory, with this information being respectively associated with the associated code and, for example, relating to the nature of the product or of the service, to the place of production or the point of sale, to the time of production or the time of sale and/or to the price of the product or of the service.

This additional information can either be contained in the code or it is stored, without the participation of the customer prior to the purchase of the product or of the service, in the reference memory of the data collecting station, in particular together with the associated code.

In the last named alternative it is of advantage that the additional information need not be contained in the code itself, which ultimately means that it is possible to operate with shorter code lengths.

The storage of the additional information basically also makes it possible to obtain additional information concerning the purchase behaviour of a particular customer.

A further security against misuse of the method of the invention can be realised if a code transmitted several times by one or more customers to the data collecting station is only taken into account by the data collecting station when first transmitted. Accordingly, through the transmission of a single code, the customer cannot simulate two or more purchase transactions although actually only one purchase was made.

It is not absolutely essential for the correct carrying out of the method of the invention that all codes handed out in connection with products or services are fundamentally distinguished from one another. On the contrary, it is sufficient if those codes which are transmitted within a particular time interval to the data collecting station are distinguished from one another with at least a specific probability. It is, however, preferred if all the codes transmitted within a particular time interval to the data collecting station are distinguished from one another.

The above named measure is particularly of relevance when not only the customer's address but also his purchase behaviour is to be determined, or when a rebate or coupon system is to be established by means of the method of the invention in which, for example, one obtains some kind of award from a specific number of purchased products or collected points onwards.

It is of advantage when at least an element of the code consists of a random number. It is preferred if a pseudo random number is used here, and the pseudo random number generator that is used must ensure that all the random numbers generated within a specific time interval are distinguished from one another. Should a pseudo random number generator of this kind also actually generate a number which was generated at an earlier time within a defined time interval, then this newly generated random number would be rejected and a new random number generated which is distinguished from the random numbers previously generated within the time interval.

The codes containing the random numbers can be centrally generated, stored in the reference memory of the data collecting station and made available to the respective offerees of products or services, so that these can hand out the generated code to the particular customer in connection with their product or their service.

In just the same way it is possible for the codes to be generated by the offerees of the products or of the services themselves, for example by means of a suitable random number generator, and then communicated to a central position, in particular to the reference memory of the data collection station. When various offerees generate codes, then it must be ensured that two offerees do not generate the same code. This can, for example, be achieved in that an invariable code identifying the particular offeree or the particular random number generator is added to the code in addition to the random number generated.

With the two above named alternatives it is ensured that codes handed out in connection with the products or services are already present in the reference memory of the data collecting station at the time they are handed out so that a check can be made whether a code transmitted by a customer to the data collecting station is valid.

The code of the invention preferably consists of a sequence of numbers and/or a sequence of letters/numbers and/or of a bar code and/or of magnetically, optically or electronically stored data. It is particularly preferred when the code is made so that it is readable by a machine. This is then advantageous if the customer, for example, operates a PC connected to the Internet, with the PC being equipped with an apparatus for reading a machine-readable code. In this case, the data transfer can be made particularly simple for the customer. The possibility of misuse is also reduced through the use of a machine-readable code, in particular a bar code, because a code of this kind can only be decoded by means of a corresponding reading device. Thus, it can for example by precluded that a code located on a product package is noted by someone who does not purchase the product at all who could then simulate the purchase of the product by the transfer of the noted code.

Should the code not be applied to a product itself or to a product package, but rather records be used as a code carrier, then it is sensible to use receipts printed out by computerised tills for this purpose. In this way it is not necessary to generate additional records for the realisation of the method of the invention, since the invoices which are in any case produced can simply be additionally provided with the code of the invention.

In a modification of the method of the invention it is also possible to transmit a code generated in the computerised till to the data collecting station directly from the computerised till together with data characterising the customer. The customer must in this case only advise the till operator of the data characterising him in a suitable manner. Further action on the part of the customer is then no longer necessary.

The code of the invention can naturally also be applied to entry cards, telephone invoices sent by post and the like, apart from applying it to product packages or invoices Furthermore, it is possible to form at least a part of the code to be transmitted by a commercially customary bar code price label. Information is in any event contained in these bar code price labels concerning the respectively acquired product, so that this data no longer has to be separately recorded in the code of the invention or transmitted to the data collecting station. For example, it is possible to transmit the code which is printed onto an invoice printed out by a computerised till, and which for example brings about protection against misuse through a random number contained therein, in addition to the codes which are printed on the bar code price labels.

Another possibility or an additional possibility of precluding misuse of the method of the invention lies in arranging the code at a position of a product package or a product label which is not visible and/or not accessible from the outside, in particular by printing it thereon, by punching it therein or by adhering it thereto. In this manner, a situation is avoided in which a customer with free access to product packages exhibited in a multiple store notes the code present on the product package and transmits it to the data collecting station without having purchased the product. In the last named case, only the customer who has actually purchased the product and opened the package can see the code to be transmitted, so that misuse is precluded.

As a result of the information obtained on the purchasing behaviour of the customer a situation can for example be achieved in which customers can be individually wooed, with the advertising being in each case specifically matched to the purchasing behaviour that has been established.

In order to enable more targeted advertising, customer-specific data such as for example the name, the postal address, the telephone number, the age, the sex and/or the profession of the customer can be stored in the data collecting station. In particular, it is sensible to store the network address, and in particular the Internet address of the customer in the data collecting station, since then the automatic transmission of advertising messages via the network or via the Internet is possible, which is advantageously associated with significantly lower cost than the transmission of advertising messages by post.

For specific applications it can also be interesting to store in the data collecting station the time of the data transmission by the customer to the data collecting station. If, for example, the time of manufacture of a product which is also contained in the code is transmitted, then in this way a determination can be made, at least with a certain probability, as to the amount of time which elapses between the manufacture and the sale of a product.

If a situation is to be achieved with the system of the invention in which a frequently repeating contact to the customer is to be established over a longer period of time, i.e. that the customer, in particular in connection with a rebate or coupon system, makes contact several times with the data collecting station—always after the purchase of a product or of a service—then the system of the invention can be realised particularly economically in the manner which will subsequently be described.

Customer-specific data, in particular the name, postal address and/or the network address, are only stored when a customer first makes contact with the data collecting station, whereupon a code number or a characteristic code is associated with the customer when contact is first made. This is in particular possible when the communication between the customer and the data collecting station takes place via a telephone network.

The allotting of the code number or of a characteristic code also ensures, in an advantageous manner, that the customer can be identified by means of the code number or the characteristic code in all further contacts which take place after the first contact, so that for these further contacts no customer-specific data need any longer be transmitted, but rather it is only necessary to transmit the code number or the characteristic code and the code associated with the respectively purchased product or service. The last named transmission can take place fully automatically, at least at the data collecting station side.

This embodiment of the method of the invention is particularly preferably usable when the data transmission takes place via a telephone network since in this case the customer-specific data can be found on first making contact, for example via a call centre, whereupon all further customer contacts can then be dealt with fully automatically. In this case the call centre then conducts a conversation with the customer when contact is first made during which the customer divulges the desired data and a code number or a characteristic code is given to the customer by the call centre. The call centre then brings about the storage of the customer-specific data and also of the code number or characteristic code.

When the customer subsequently makes contact an automatic message then asks the customer whether he already has a code number or not. The customer can then answer this question by means of a keyboard input, whereupon he is either switched through to the call centre—on first making contact—or an automated process takes place at the data collecting station in the case of a further contact. In the context of this automated process the customer is asked, by means of a message, to feed in the code associated with the product or service via the telephone keyboard after he has identified himself by means of his code number or characteristic code which is likewise fed in via the telephone keyboard.

In the described manner, all further contacts after the first contact has been made can take place fully automatically at the data collecting station side without human assistance, which offers a considerable economic advantage.

An advantageous use of the method of the invention is that a customer, after he has made a certain number of purchases which correspond to a particular value, or after he has collected a certain number of points, receives an immediate reward via the communication network, in particular via the Internet. This reward can, for example, take the form of a credit of a certain amount of money (e-cash), or can take place by granting certain Internet shopping rights or by granting user rights which can be exploited via the Internet.

It is in particular also possible to give the customer access rights to a predetermined Internet address, in particular a free line to a chat room as a reward in dependence on specific data stored in the data collecting station with respect to a customer. In this manner only those Internet participants can, for example, obtain access to specific chat rooms who have purchased a specific quantity of proprietary articles within a specific period of time.

A targeted and individual wooing of a customer is particularly economically practicable in the context of the method of the invention, in particular when contact is automatically established with the customer via a communication network, in particular via the Internet, in dependence on specific data stored with respect to a customer in the data collecting station. The selection of the respective advertising message can then take place preferably in dependence on the stored data, so that individual advertising messages adapted for example to the specific purchasing behaviour of the respective customer are transmitted. In just the same way it is naturally possible to correspondingly and differentially woo customers of different age groups or different sexes.

In the context of the invention protection is also claimed for apparatus for manufacturing product packages, product labels and/or product tags usable in the context of the method of the invention, with the apparatus having a unit for marking the product packages, product labels and/or product tags with a code. A pseudo random number generator of the above described kind which is suitable for generating the code of the invention can additionally be integrated into this apparatus. Furthermore, the apparatus can have a device by means of which the code generated in the apparatus can be transmitted to the data collecting station, in particular to its reference memory.

The device for effecting the marking is preferably designed so that the code can be applied to a position of the finished product package which is not visible from the outside, in particular to the rear side of an already printed or yet to be printed package section.

In the context of the invention protection is also claimed for a computerised till which has a unit for generating or for receiving a code in accordance with the invention and a printing mechanism for printing this code onto a receipt.

The computerised till can furthermore be equipped with a random number generator to generate at least an element of a code of the invention. It is of advantage here when a device is provided to avoid the generation of two identical codes within a specific time interval.

It is likewise preferred when the computerised till has a connection for a communication network, in particular an Internet connection, by which the generated or printed codes, and/or an additional information generated by the computerised till, can be transmitted to the data collecting station. If the codes are not generated in the computerised till, it is also possible, via the said connection for the communication network, to transfer codes which are generated at a central position, in particular in the data collecting station, from the central position to the computerised till, where these codes are then printed onto the receipts.

A connection of this kind for a communication network is in particular significant when a comparison is to be made in the data collecting station, in the manner already described above, of the code which is either generated by the computerised till or by a central position with the code transmitted by the customer, in order to preclude the possibility of misuse in this way.

It is particularly advantageous when a device is contained in the computerised till which makes it possible for the code generated to be transmitted only package-wise, in particular at predetermined times or in predetermined time intervals, in order to minimise the connection costs which arise in this way.

In the context of the invention protection is also claimed for printed till receipts, printed invoices or printed entry cards for use in the method of the invention, with a code in accordance with the invention being applied to the above named articles, and indeed in addition to the customary particulars, such as price, date, point of sale, product specification and the like. The code can for example be printed thereon, punched therein, adhered thereto or accompany the articles in some other manner.

In the context of the invention, protection is also claimed for product packages, product labels and/or product tags in which the code of the invention is arranged at a position which is not visible and/or not accessible on a filled and closed product package.

Finally, protection is claimed in the context of the invention for a method for building up a data bank containing customer data and/or of organising a rebate or coupon system in which products to be sold to customers or records handed out to customers on the purchase of products or services are each provided with a code and the customer is motivated to subsequently transmit the code together with data characterising the respective customer to a data collecting station via a communication network, in particular via a telephone network or via Internet. This method can be further developed in accordance with the above described examples.

BRIEF DESCRIPTION OF THE DRAWINGS

The preferred embodiment of the method of the invention will be described in the following with reference to the drawings in which are shown.

DETAILED DESCRIPTION OF THE DRAWINGS

Figure 1:
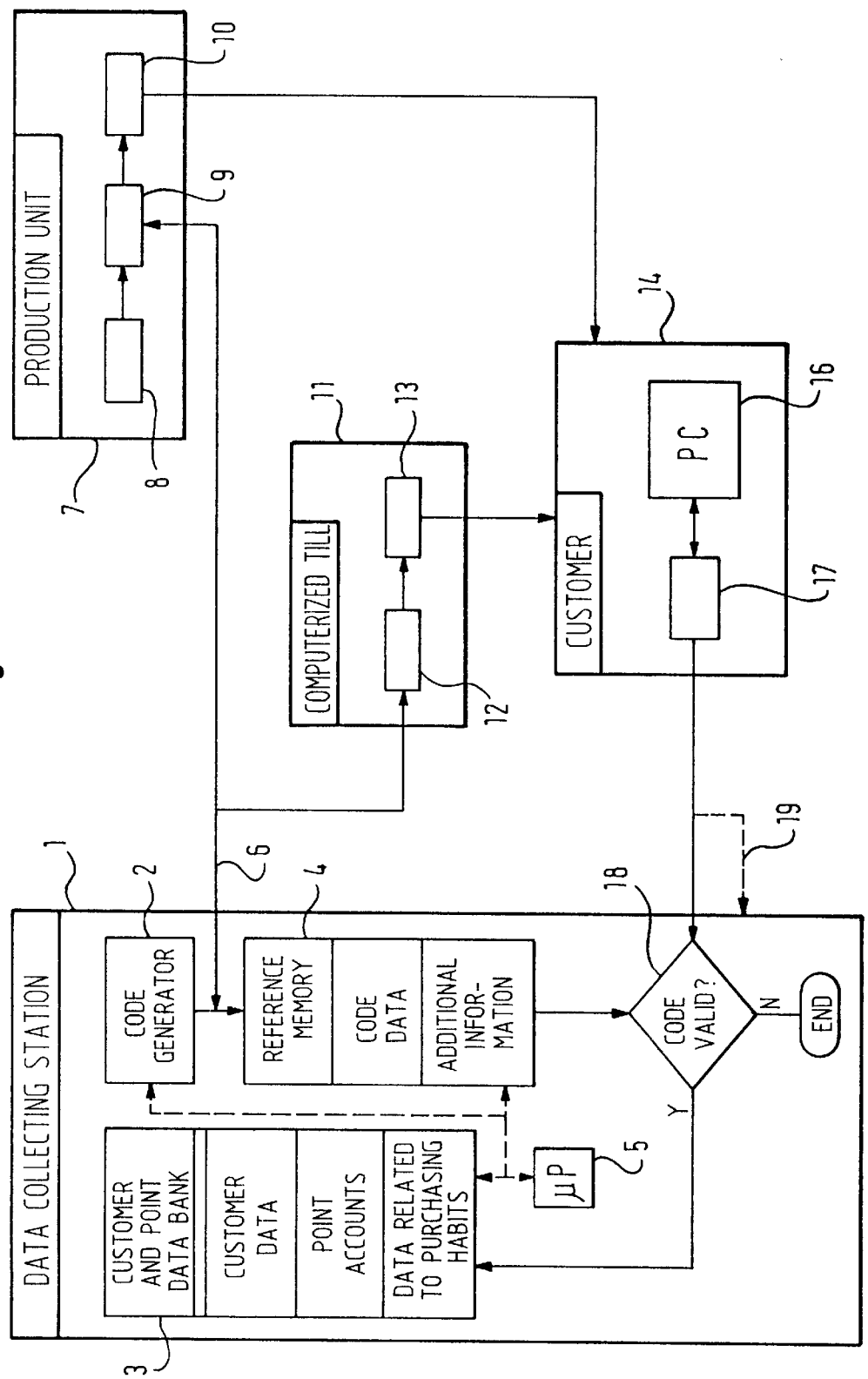
FIG. 1 a diagrammatic representation of the principle of cooperation of individual components for the realisation of the method of the invention, FIG. 2 a product package in accordance with the invention, and FIG. 3 a receipt printed in accordance with the invention.

FIG. 1 shows a data collection station 1 which is equipped with a code generator 2, with a customer and point data bank 3 and also with a reference memory 4. The cooperation of these components 2, 3, 4 is controlled by a control unit 5.

When appropriately energised by the control unit 5, the code generator 2 generates a packet of codes which differ from one another. An additional information, for example a product specification and a product price, is in each case associated with the generated codes via the control unit 5, for example by manual input. This information is then stored together with the generated code in mutually associated form in the reference memory 4. The reference memory 4 thus consists essentially of a table in which a product specification and a product price is associated with each code.

The codes generated by the code generator 2 are transmitted packet-wise—without the said additional information—via an Internet connection 6 to a production unit 7 in which product packages are manufactured and filled.

This production unit 7 has an apparatus 8 in which package sections are generated. These package sections then pass to a unit 9 which is designed to receive the code transmitted by the code generator 2. The codes received by the unit 9 are printed onto the package sections by a printing mechanism which is likewise contained in the unit 9. The printing mechanism is arranged so that the code is ultimately placed at a position of the finished product package which is not visible from the outside.

In the context of the printing process it is ensured that an individual code is printed onto each package section, i.e. within a defined period of time, for example within one or two years, no two package sections are produced which have the same code.

The package sections which are printed in the named manner now pass into a packaging unit 10 in which the product packages are finished and filled.

Starting from the code generator 2, packets of codes are transmitted from the code generator 2 via the Internet connection 6 not only to the production unit 7, but rather also to a computerised till 11.

The computerised till 11 has a unit 12 for receiving codes or code packets transmitted via the Internet connection 6. The received codes are then printed by a printing mechanism 13 onto till receipts which are to be printed out by the computerised till 11, with it being ensured that an individual code is associated with each till receipt, i.e. no two identical codes are printed onto different till receipts, at least within a specific period of time.

The control 5 contained in the data collecting station 1 controls the code generator 2 in such a way that it is ensured that the production unit 7 for manufacturing product packages and the computerised till 11 respectively receive differing codes, so that no code exists which is simultaneously applied to a product package and to a receipt. On integration of a plurality of production units 7 and/or a plurality of computerised tills 11 into the method of the invention the control unit 5 accordingly ensures that codes which are always different are always transmitted to all attached units 7, 11—at least within specific time intervals.

A customer 14 acquires, via customary distribution paths, products which are provided on the inner side with codes which have been applied by the unit 9. Furthermore, receipts printed out by the computerised till 11 are handed out to the customer 14 in the context of the purchase of specific products or services and these receipts are provided with a code printed by the unit 13.

The customer 14 thus obtains knowledge in the described manner of codes which were previously generated by the code generator 2 and were transmitted either to the production unit 7 or to the computerised till 11.

The customer 14 transmits the codes which have been brought to his attention to the data collecting station 1 by means of his PC 16 and the Internet interface 17 attached thereto. In doing so, the customer 14 first feeds in data characterising himself in order to identify himself to the data collecting station 1. This leads, on a first contact, to a new data set being laid on in the data collecting station 1 for the customer 14 in the customer and point data bank 3. On a second or further contact, the customer simply identifies himself with reference to a code number allotted in the context of the first contact.

With future technologies it is also conceivable that the code will be transmitted on purchase of the product direct by wireless or by wire from a computerised till 11 into a mobile customer PC from which the further transmission to the data collecting station 1 then takes place. In this case the code input which is to be effected by the customer can then be spared.

In accordance with the above named identification of the customer 14 a check is made in the data collecting station 1 at 18 whether the code transmitted is a valid code. For this purpose, the transmitted code is compared with the codes stored in the reference memory 4. If the transmitted code is present in the reference memory 4, then this is a valid code. Otherwise the code is invalid.

If now a valid code transmission from the customer 14 to the data collecting station 1 is determined, then the customer and point-data bank 3 is correspondingly actualised, i.e. the point account of the customer 14 is increased.

The additional information associated with the transmitted code and stored in the data collecting station 1 before the code transmission are in particular transferred from the reference memory 4 into the customer and point data bank 3 and associated with the respective customer 14. This data then gives information concerning the purchasing behaviour of the customer 14.

Furthermore, the value of the transmitted code is checked, whereupon a corresponding number of points is credited to the customer 14, to his point account present in the customer and point data bank 3.

After a code transmitted by the customer 14 has been recognised as valid, this code is cancelled in the reference memory 4 to avoid the code being recognised a second time as a valid code should the customer, for example, send the same code to the data collecting station 1 again.

This procedure can be repeated by the customer 14 with each new code which is made accessible to him via product packages or till receipts. In this manner, points can be collected by the customer 14 which he can then cash in in the initially described manner for a correspondingly devised reward.

Accordingly, the point account of the customer 14 grows with each valid code transmitted by the customer 14 to the data collecting station 1 and additional data concerning his purchase behaviour is stored in the customer and point data bank 3. This data can be utilised in the initially likewise described manner by the offeree of the products or services purchased by the customer 14, in particular for the adaptation of the respective marketing strategy or for the transmission of advertising messages.

It is of advantage when the data collecting station 1 can determine with reference to the code transmitted by the customer 14, or with reference to the additional information stored in the reference memory 4 with respect to this code, from which product offeree or service offeree the customer 14 obtained knowledge of the respective code. In this case, for example on establishing an Internet connection between the customer 14 and the data collecting station 1, an advertisement relating to the respective offeree can be blended in or a switch can be made to the home page of the respective offeree. Through the last named measure, the offeree can enter into direct interactive contact with the customer 14.

When the customer 14 wishes to learn the state of his point account, or to trade in the collected points against a reward, then he can enter into contact with the data collecting station 1 via the Internet connection 19 and trigger the desired actions.

In the context of the above described method codes are transmitted by the code generator 2 to the computerised till 11. It is preferable when codes of different value are transmitted here, i.e. codes which correspond to different point values and for these codes to be applied to the receipts to be printed in dependence on the amount of the purchase that is made. In this way a situation can be achieved in which for a purchase with a high value a higher number of points can also be collected. Attention must naturally be paid in this respect to ensuring that a sufficient supply of codes of different value is always stored in the computerised till 11.

On transmission of the codes from the code generator 2 to the computerised till 11 the transmitted codes are simultaneously stored in the reference memory 4 together with an identification of the computerised till 11, so that a determination can be made in the data collecting station 1, on transmission of the code from the customer 14 to the data collection station 1, regarding the computerised till 11 at which the customer 14 made his purchase. Prior to transmission of the code from the customer 14 to the data collecting station 1 the code of the computerised till 11 represents an additional information stored in the reference memory 4.

As an alternative to the described method it is also possible to generate the codes in the production unit 7 and/or in the computerised till 11 itself and to transmit the generated codes via an Internet connection to the reference memory 4 of the data collecting station 1. At the same time as this code transmission the respective additional information is then also transmitted from the units 7, 11.

The last named alternative is in particular of advantage with respect to the computerised till 11 since on printing a receipt handed out to the customer 14 the computerised till knows what type of products the customer 14 has purchased and which prices are respectively associated with these products. Furthermore, the computerised till 11 has knowledge concerning the date of the purchase that is made.

All this additional information can be transmitted from the computerised till 11 to the reference memory 4 for the purpose of later evaluation in the customer and point data bank 3.

With this method it is necessary for an element of the code generated in the units 7, 11 to represent an individual and unchanging code for the units 7, 11 in order to ensure in this way that non-identical codes are generated in different units 7, 11. Furthermore, a random number generator must be present in the units 7, 11 which is programmed so that at least codes generated within a specific time period are different from one another.

Figure 2:
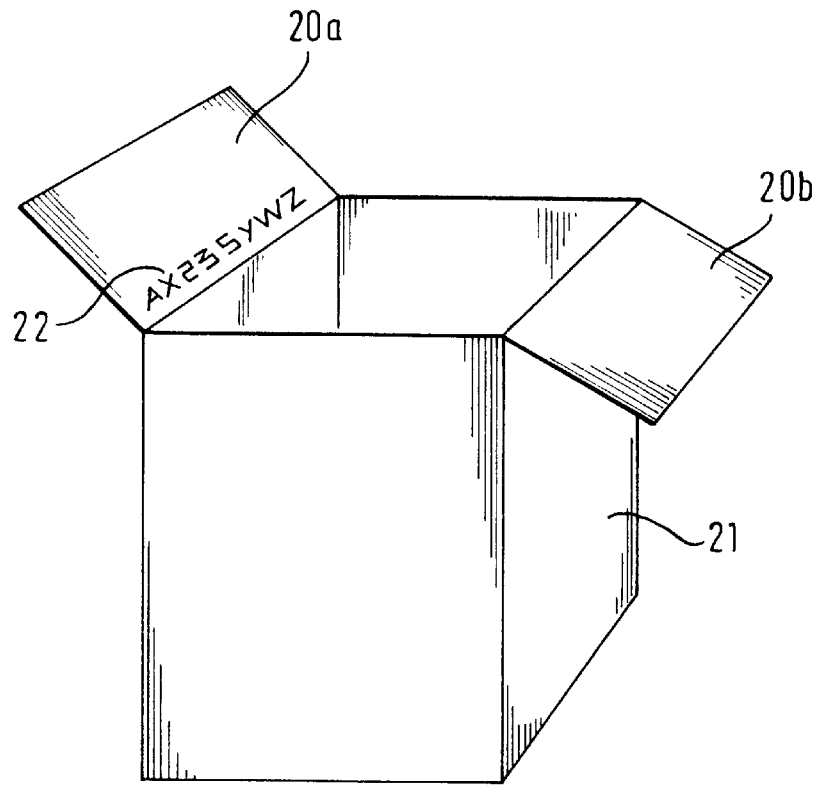

FIG. 2 shows a product package 21 which can be used in the context of the method of the invention.

A code 22 is printed onto the inner side of the cover part 20a of the product package 21 and is not visible when the package 21 is closed.

Figure 3:
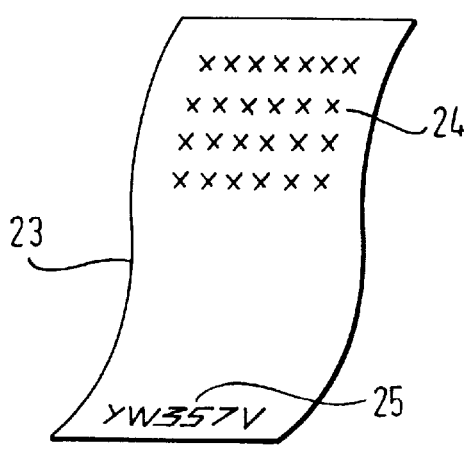

FIG. 3 shows a record 23 which can be used in the context of the method of the invention which, in addition to the customarily printed data 24 also has a code 25 in accordance with the invention. In contrast to the product package 21 in accordance with FIG. 2, the code 25 does not have to be hidden on the record 23, because the record is in any event only handed out to the customer who has made the corresponding purchase. A misuse is thus not possible.

I claim:

1. A method for motivating a customer to purchase a product or a service and for rewarding the customer for repeat purchases thereof, the method comprising the steps of:

applying a unique code to evidence of the purchase of the product or service;

giving a customer access to the evidence including the code thereon after the customer has completed the purchase, wherein the evidence is part of the product, and including the step of applying the code to the product so that the code remains invisible to the customer until after the customer purchased the product;

establishing a central data processing and retention having an Internet connection;

causing the customer to contact the station via the Internet and to transmit the code and data identifying a characteristic of the customer to the processing station;

at the processing station assigning a digitally accessible account to the customer;

digitally receiving the code and the data transmitted by the customer and without human intervention directing at least the data transmitted by the customer via the Internet to the account;

in the account, storing a value assigned to the product or service;

repeating the steps of giving, transmitting the code via the Internet to the processing station, and digitally receiving and storing; and permitting the customer via the Internet and without further human intervention to redeem accumulated values in the account and apply the redeemed accumulated values to at least one of a plurality of uses selected by the customer.

2. A method according to claim 1 wherein the evidence is a receipt and including providing the customer with the receipt.

3. A method according to claim 1 including the step of accessing the account at the station via the Internet and providing an account status update.

* * * * *

(12) EX PARTE REEXAMINATION CERTIFICATE (5439th)
United States Patent
Finsterwald

(10) Number: US 6,039,244 C1
(45) Certificate Issued: Jul. 4, 2006

(54) METHOD OF BUILDING UP A DATA BANK CONTAINING CUSTOMER DATA AND/OR FOR THE ORGANIZATION OF A REBATE OR COUPON SYSTEM

(75) Inventor: Martin Finsterwald, Munich (DE)

(73) Assignee: Carlson Marketing Group, Inc., Plymouth, MN (US)

Reexamination Request:
No. 90/006,761, Aug. 25, 2003

Reexamination Certificate for:
Patent No.: 6,039,244
Issued: Mar. 21, 2000
Appl. No.: 08/783,372
Filed: Jan. 13, 1997

(30) Foreign Application Priority Data

Oct. 4, 1996 (DE) .......................................... 196 41 092
Jan. 2, 1997 (EP) ................................... PCT/EP97/00005

(51) Int. Cl.
*G06K 7/10* (2006.01)

(52) U.S. Cl. ........................ 235/375; 235/383; 235/468
(58) Field of Classification Search ................. 235/375, 235/383, 468; 705/14, 26
See application file for complete search history.

(56) References Cited

U.S. PATENT DOCUMENTS

| | | | |
|---|---|---|---|
| 4,024,380 A | 5/1977 | Gunn | |
| 4,109,238 A | 8/1978 | Creekmore | |
| 4,649,481 A | 3/1987 | Takahashi | |
| 4,750,119 A | 6/1988 | Cohen et al. | |
| 4,752,675 A | 6/1988 | Zetmeir | |
| 4,908,761 A | 3/1990 | Tai | |
| 4,992,940 A | 2/1991 | Dworkin | |
| 5,025,372 A | 6/1991 | Burton et al. | |
| 5,056,019 A | 10/1991 | Schultz et al. | |
| 5,173,851 A | 12/1992 | Off et al. | |
| 5,200,889 A | 4/1993 | Mori | |
| 5,287,268 A | 2/1994 | McCarthy | |
| 5,310,997 A | 5/1994 | Roach et al. | |
| 5,319,562 A | 6/1994 | Whitehouse | |
| 5,353,218 A | 10/1994 | De Lapa et al. | |
| 5,367,148 A | 11/1994 | Storch et al. | |
| 5,382,779 A | 1/1995 | Gupta | |

(Continued)

FOREIGN PATENT DOCUMENTS

| AU | 724093 | 5/1998 |
|---|---|---|
| CA | 2267388 | 4/1998 |
| DE | 3723189 A1 | 2/1988 |
| DE | 69018007 T2 | 10/1995 |

(Continued)

OTHER PUBLICATIONS

Kumar, Manoj et al., "Sales Promotion on the Internet", {mkumar, anand, anant, rakesh}@watson.ibm.com, IBM Research Division, T.J. Watson Research Center, Yorktown Heights, NY.

(Continued)

*Primary Examiner*—Karl D. Frech

(57) ABSTRACT

The invention relates to a method of building up a data bank containing customer data and/or for the organization of a rebate or coupon system. Furthermore, the invention relates to the use of such a method and also to computerized tills usable in the context of the method, to printed till receipts, printed invoices, printed entry cards, product packages, product labels and product tags. Finally, the invention also relates to an apparatus for the production of the said product packages, product labels and product tags. In the context of the invention products to be sold to customers, or records handed out to the customers on purchase of products or services, are respectively provided with an individual code and the code is transmitted by the customer, after purchase of the product or of the service, together with data characterizing the respective customer to a data collecting station via a communication network, in particular via the Internet or via a telephone network, with the data collecting station being laid out to at least store the data characterizing the respective customer.

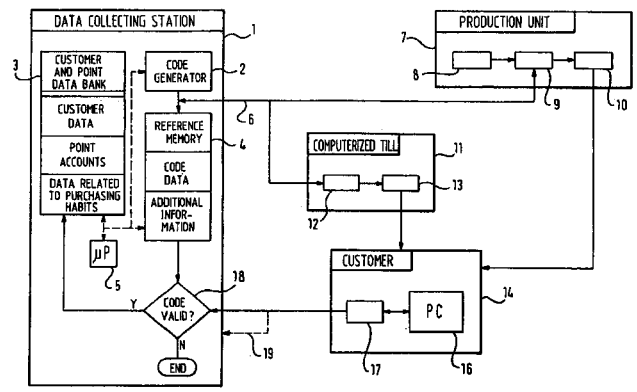

U.S. PATENT DOCUMENTS

| | | | |
|---|---|---|---|
| 5,408,077 | A | 4/1995 | Campo et al. |
| 5,467,269 | A | 11/1995 | Flaten |
| 5,483,444 | A | 1/1996 | Heintzeman et al. |
| 5,537,314 | A | 7/1996 | Kanter |
| 5,592,560 | A | 1/1997 | Deaton et al. |
| 5,602,377 | A | 2/1997 | Beller et al. |
| 5,665,951 | A | 9/1997 | Newman et al. |
| 5,665,953 | A | 9/1997 | Mazzamuto et al. |
| 5,689,100 | A | 11/1997 | Carrithers et al. |
| 5,708,780 | A | 1/1998 | Levergood et al. |
| 5,710,886 | A | 1/1998 | Christensen et al. |
| 5,710,887 | A | 1/1998 | Chelliah ............ 705/26 |
| 5,715,314 | A | 2/1998 | Payne et al. |
| 5,727,163 | A | 3/1998 | Bezos |
| 5,729,693 | A | 3/1998 | Holda-Fleck |
| 5,761,648 | A | 6/1998 | Golden et al. |
| 5,765,141 | A | 6/1998 | Spector |
| 5,774,870 | A | 6/1998 | Storey |
| 5,791,991 | A | 8/1998 | Small |
| 5,794,210 | A | 8/1998 | Goldhaber et al. |
| 5,806,043 | A | 9/1998 | Toader |
| 5,806,044 | A | 9/1998 | Powell |
| 5,806,045 | A | 9/1998 | Biorge et al. |
| 5,809,144 | A | 9/1998 | Sirbu et al. |
| 5,855,007 | A | 12/1998 | Jovicic et al. |
| 5,892,827 | A | 4/1999 | Beach et al. |
| 5,918,211 | A | 6/1999 | Sloane ............ 705/16 |
| 5,937,391 | A | 8/1999 | Ikeda et al. ............ 705/14 |
| 5,956,695 | A | 9/1999 | Carrithers et al. ............ 705/14 |
| 5,983,196 | A | 11/1999 | Wendkos |
| 6,009,411 | A | 12/1999 | Kepecs |
| 6,009,412 | A | 12/1999 | Storey |
| 6,014,634 | A | 1/2000 | Scroggie et al. |
| 6,047,269 | A | 4/2000 | Biffar ............ 705/39 |
| 6,144,848 | A * | 11/2000 | Walsh et al. ............ 455/419 |
| 6,237,145 | B1 | 5/2001 | Narasimhan et al. ............ 725/23 |
| 2002/0082918 | A1 | 6/2002 | Warwick |
| 2004/0144839 | A1 | 7/2004 | Warwick |

FOREIGN PATENT DOCUMENTS

| | | |
|---|---|---|
| DE | 19641092 A1 | 4/1998 |
| EP | 0354260 A1 | 2/1990 |
| EP | 0377515 A2 | 7/1990 |
| EP | 0929874 | 6/2001 |
| WO | WO-95/34857 A1 | 12/1995 |
| WO | WO-98/15907 A1 | 4/1998 |
| WO | WO-02/061524 A2 | 8/2002 |

OTHER PUBLICATIONS

Neuborne, Ellen, "Pepsi's Aim Is True", *Business Week E.Biz*; Special Report; Online Advertising; No. 3716, p. EB52, Jan. 22, 2001.

"Pepsi–Cola News (Mar. 27, 1996)", http://www.pepsico.com/web_pages/pcnews1.html.

"Coupon Clippers are Logging on for Savings at Ann Arbor website", http://detnews.com/menu/stories/39326.html.

*Rapport d'activité 1996*, Published by Groupe High Co., (1996), 1–11.

"Offres de Remboursement—Simple Comme un Coup de fil", *Extrait du Magazine Points de Vente*, (Jan., 1996), 1 Pages.

Belanger, J.–M., "Paribas Capital Markets/Courcoux–Bouvet—Analysis of High Co.", Published by European Equity Research,(Mar. 27, 1996),50 Pages.

Deighton, J., et al., "Chapter 3—Consumer Transaction Databases: Present Status and Prospects", In: *The Marketing Information Revolution*, Edited by Robert C. Blattberg, Harvard Business School Press,(1994),58–79.

Ing, D., et al., "Chapter 2—Point–of–Sale Data in Consumer Goods Marketing: Transforming the Art of Marketing into the Science of Marketing", In: *The Marketing Information Revolution*, Edited by Robert C. Blattberg, et al., Harvard Business School Press,(1994),30–57.

Katahira, H., et al., "Chapter 14—Marketing Information Technologies in Japan", In: *The Marketing Revolution*, Edited by Robert C. Blattberg, et al., Harvard Business School Press,(1994),306–327.

Masing, W., "42. Datenflussaus dem Feld", *Handbuch der Qualitätssicherung*, Carl Hanser Verlag, München, Wien, (1980),709–726.

Peppers, D., et al., "Chapter 4—Differentiate Customers, Not Just Products", In: *The One–to–One Future—Building Relationships One Customer at a Time*, Published by Doubleday (First Edition, 1993),95–138.

Peppers, D., et al., "Chapter 7—Engage Your Customers in Dialogue", In: *The One–to–One Future—Building Relationships One Customer at a Time*, Published by Doubleday (First Edition, 1993),209–266.

Yamada, K., "Developers Eye Online Registration Options—Concerns about privacy, competition spur controversy", *Computer Reseller News*, (Jun. 5, 1995), 2 Pages.

Wendkos Provisional Application filed on Dec. 19, 1995, Ser. No. 60/008,873.

Peppers and Rogers, "The One to One Future"; Doubleday 1993.

The Trail Guide to Prodigy; Addison–Wesley 1995.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *